C. GARVER.
AUTOMATIC WAGON BRAKE.
APPLICATION FILED JAN. 23, 1909.
944,961.
Patented Dec. 28, 1909.
2 SHEETS—SHEET 1.
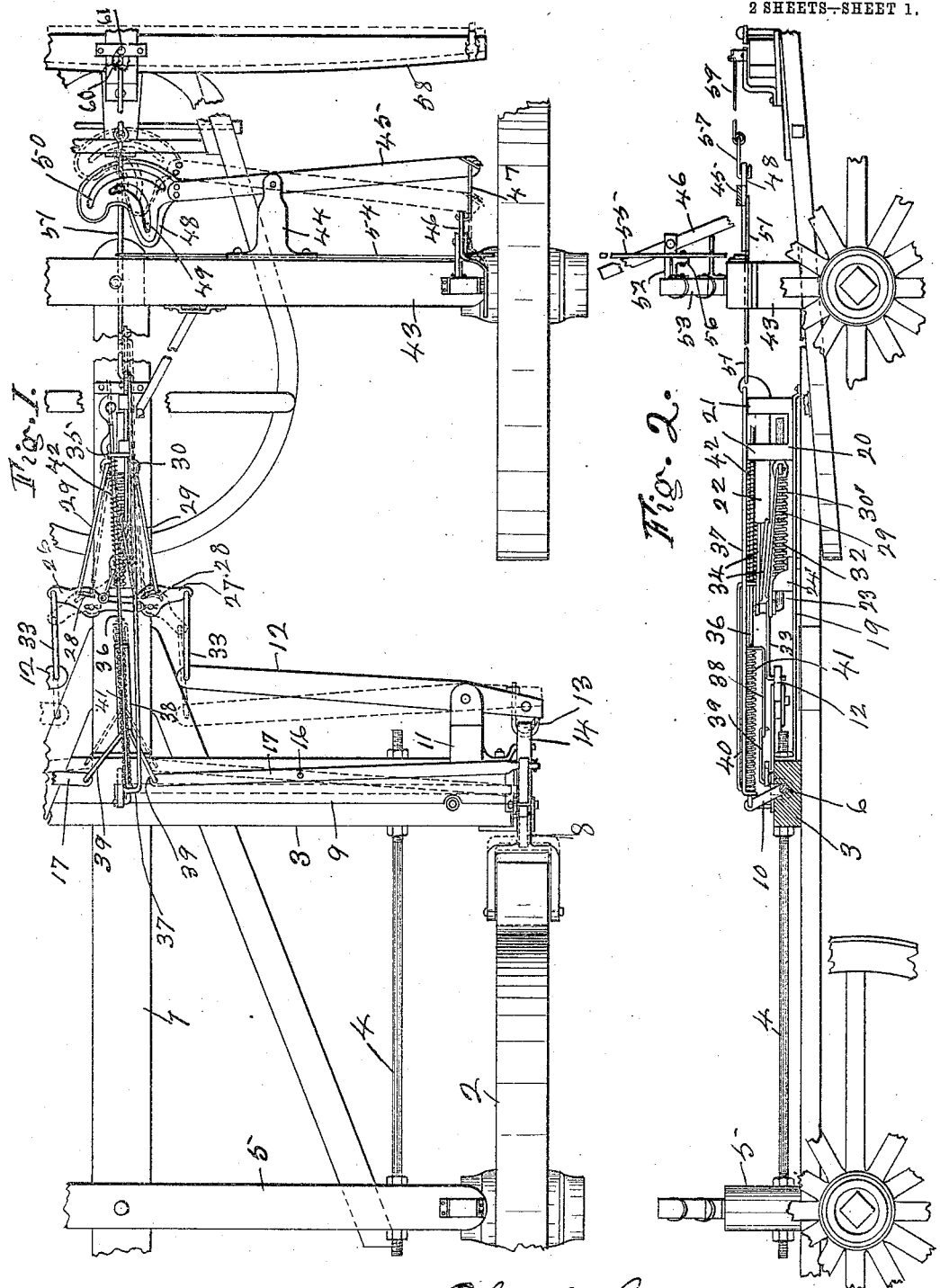
WITNESSES:
Augusta Viberg.
Auguste Spiegel.
Charles Garver INVENTOR.
BY Chapin & Denny
his ATTORNEYS.

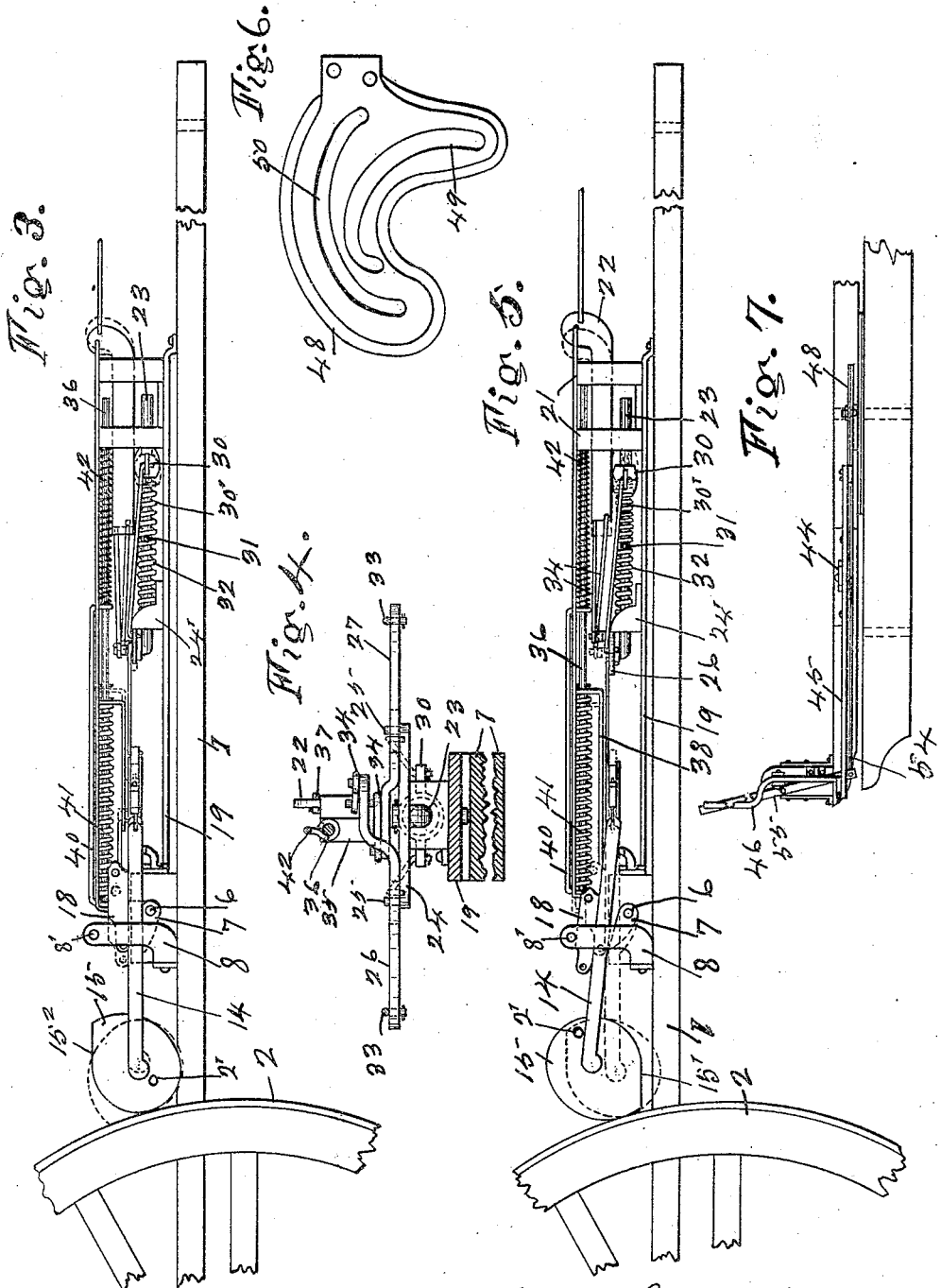

UNITED STATES PATENT OFFICE.

CHARLES GARVER, OF FORT WAYNE, INDIANA, ASSIGNOR OF ONE-THIRD TO OREN R. YERKS, OF NEW HAVEN, INDIANA.

AUTOMATIC WAGON-BRAKE.

944,961.      Specification of Letters Patent.      Patented Dec. 28, 1909.

Application filed January 23, 1909. Serial No. 473,811.

*To all whom it may concern:*

Be it known that I, CHARLES GARVER, a citizen of the United States, residing at Fort Wayne, in the county of Allen, in the State of Indiana, have invented certain new and useful Improvements in Automatic Wagon-Brakes; and I do hereby declare that the following is a full, clear, and exact description of the invention, which will enable others skilled in the art to which it appertains to make and use the same, reference being had to the accompanying drawings, which form part of this specification.

My invention relates to improvements in automatic wagon brakes.

The object of my present invention is to provide a comparatively cheap, simple, efficient and reliable wagon brake so constructed and arranged as to automatically retard the vehicle, upon which it is mounted, in its descent of a down grade with a degree of force approximately proportional to such grade, and also to automatically lock the vehicle against a retrograde movement upon an incline when the vehicle is temporarily halted in its descent, and also adapted to be temporarily secured, when desired, out of its operative relation with the wheels, as when the vehicle is traveling upon a level road, or in mud and the like.

My invention consists of a transverse brake beam fixed upon the reach forward of the rear wheels of the vehicle and provided upon its opposite ends with upright guide brackets; bifurcated brake-shoe brackets pivotally fulcrumed at their inner ends and arranged in the guide brackets; brake-shoes pivotally mounted in their supporting brackets; brake-levers fulcrumed near their outer ends which are pivotally connected to the brake-shoe brackets; means for limiting the vertical play of the brake-shoe brackets in their guiding means; means for temporarily elevating the brake-shoe brackets to the uppermost limit of their movement; a horizontal plate mounted on the reach forward of the brake-beam; spring-pressed means mounted on the said plates and pivotally connected at one end with the brake-levers and brake-shoe bracket supporting and limiting means, and connected at its other end with a slidably movable double tree; and means for locking the brake-mechanism out of operative position.

The principal novel features of my invention reside in the means for elevating and actuating the brake-shoe brackets; the spring pressed means for automatically securing the brake-shoe actuating means in normal position; and the means for temporarily securing the brake mechanism out of its operative relation with the wheels.

Similar reference numerals indicate like parts in the several views of the drawings, in which—

Figure 1 is a plan view of my invention partly broken away in position upon a vehicle, also partly broken away, showing the relative arrangement of the operative parts, and also showing in dotted outline the position of the parts when out of action. Fig. 2 is a side view of the same with the brake-beam in cross-section to show the longitudinal operating rod rotatively mounted therein. Fig. 3 is an enlarged detail side view brake-shoe actuating mechanism, showing in dotted outline the other limit of its movement, and the position of the brake-shoe when descending an incline. Fig. 4 is an enlarged detail rear view of a portion of the spring-pressed mechanism showing the reach and supporting plate in cross-section. Fig. 5 is a similar view to that of Fig. 3 showing the operative parts in the other limit of their movement, and the position of the brake-shoe in locking the vehicle upon an ascent. Fig. 6 is an enlarged detail of a portion of the means for temporarily securing the brake mechanism out of action. Fig. 7 is a front end view of the means for securing the brake-mechanism out of action.

At a suitable point on the wagon reach 1 and in proper relation to the front face of the perimeter of the rear wheel 2 is rigidly fixed the transverse brake-beam 3, Fig. 1, of proper strength and dimensions, which is firmly braced against lateral strains by means of a pair of rods 4 whose forward ends are fixed therein near its ends, and whose rear ends are fixed in the rear bolster 5. By means of the rods 4 the brake beam can readily be adjusted to and from the rear wheels as desired.

The brake beam 3 has a longitudinal recess throughout its length in which is revolubly mounted a rock-shaft 6, Fig. 2, provided at its opposite ends with the fixed radial arms 7, pointing rearwardly and arranged in the respective upright bifurcated guide brackets 8 rigidly secured to the respective ends of the brake beam. The rock-shaft 6 is preferably concealed by means of a plate 9 fixed upon the upper face of the containing brake-beam. The rock-shaft 6 is also provided at or near the middle of its length with a short radial rearwardly inclined arm 10, Fig. 2, for the purpose hereafter described.

At suitable points on the front face of the brake-beam 3, near the ends thereof are fixed the bracket 11 in whose bifurcated free ends the brake-levers 12 are pivotally fulcrumed near their outer ends for a limited horizontal movement. The levers 12 of similar construction, arrangement and operation, are provided at the rear faces of their outer ends with a staple 13 to which are pivotally connected the rear ends of the brake-shoe brackets 14 arranged in the respective guide brackets 8, and carrying in their rear bifurcated ends the pivotally mounted brake shoes 15, respectively. On suitable pivots 16 in the upper face of the brake-beam are loosely mounted the similar levers 17 whose outer ends are pivotally connected to the forward end of the blocks 18 arranged in the respective guide-brackets 8 and resting upon the adjacent portion of the brackets 14. The rear ends of the blocks 18 have their width reduced for the purpose hereafter described. To the front edge of the brake-beam at or near the middle of its length is fixed the rear end of the plate 19, the forward end of which is fixed to the reach 1.

To the upper face of the plate 19, at its forward end, is fixed a bracket 20 provided with a pair of longitudinally alined upright standards 21 having suitable lateral slots in which the draw-bar 22 is slidably mounted. The rear standard 21 has a lateral opening in which the forward end of the rod 23 is loosely mounted. At a suitable point on the plate 19, preferably near the middle of its length, is fixed an upright bracket 24′, having a lateral opening in which the rear end of the rod 23 is slidably mounted. On the upturned rear end of the rod 23 is rigidly fixed a transverse plate 24, Fig. 4, provided upon its opposite ends with the upright lugs 25 on which are pivotally fulcrumed the levers 26 and 27, respectively, which are provided near the middle of their length with a longitudinal vertical slot 28, Fig. 1, in which are loosely secured the rear ends of the connecting rods 29 respectively, whose forward ends are pivotally connected to the opposite sides of the collar 30 loosely mounted on the rod 23, which has a fixed diametric pin 31 between which and the sleeve 30 is arranged a coiled spring 30′ on the rod 23. A second coiled spring 32 is arranged on the rod 23 with one end bearing against the pin 31 and its other end bearing against the adjacent face of the bracket 24′. The outer ends of the levers 26 and 27 are pivotally connected with the inner and adjacent ends of the respective brake levers 12 by means of the rods 33, and the inner ends of the levers 26 and 27 are pivotally connected to the inner end of the draw-bar 22 by means of the respective rods 34, Fig. 5.

On the upper end of the rear standard 21 is arranged an apertured lateral lug 35, Fig. 1, in which is loosely mounted the forward end of the rod 36 whose rear end is pivotally connected to the upper end of the arm 10. A rod 37 in approximately parallel relation with the rod 36, has its forward end pivotally mounted in a suitable lateral aperture in the forward end of the draw-bar 22, and its rear end slidably connected to the rear end of the rod 36.

The inner adjacent ends of the levers 17 are pivotally connected to the rear end of the plate 38 by means of the links 39. The forward upturned end of the plate 38 is laterally apertured and slidably mounted on the rod 36. A third rod 40 has both ends loosely mounted on the rod 36. Between the forward end of the plate 38 and the rear end of the rod 40, on the rod 36 is loosely mounted a coiled spring 41, and between the forward end of the rod 40 and the lug 35 of the standard 21 is loosely mounted a coil spring 42.

On the front face of the forward bolster 43 is rigidly fixed a forwardly projecting bracket 44, Fig. 1, to whose free end is pivotally mounted a lever 45 whose outer end is pivotally connected to an upright operating hand lever 46 by means of the link 47, and to whose inner end is rigidly fixed a cam-plate 48, having the curved slot 49 adjacent to its rear edge, and having a curved slot 50 adjacent to its forward edge. In the slot 49 is slidably secured the forward end of the rod 51 whose rear end is loosely secured to the forward end of the draw-bar 22. The hand lever 46 is pivotally fulcrumed on the bracket 52 fixed on the bolster standard 53. Beneath the bracket 44 is arranged a rod 54 whose inner end is loosely connected to the rod 51, and whose outer end is pivotally connected to an upright operating hand-lever 55 fulcrumed in the lateral bracket 56 on the front face of the bolster standard 53. In the slot 50 of the cam plate 48 is slidably mounted the rear end of a short-rod 57 whose forward end is pivotally connected to the double tree 58 by means of the rod 59. The double tree 58 is of common form, but has a vertical transverse slot 60 through which the vertical pin or bolt 61 passes, whereby the double tree is adapted for a limited forward movement under the impulse of the draft of the team.

The operation of my invention thus described is obvious and briefly stated is as follows: The operative parts are normally in the relative position shown in full lines in Fig. 1, but when the draft of the team is exerted upon the double tree 58 they assume the relative position shown in dotted outlines through their described connection with the double tree and with one another, in which position the brake-shoes have no tendency to lock the wheels 2. It is evident that a forward pull on the draw bar 22 and its connection with the double tree actuates the brake-levers 12 through the levers 26 and 27 and the connecting rods 34 and 33, thereby withdrawing the brackets 14 and their brake-shoes from a contact with the wheel 2. This movement of the levers 26 and 27 compresses the two coil springs 30' and 32 by means of the collar 30 and the connecting rods 29, whereby the brake levers and the brake-shoes will, under the tension of the two last mentioned springs, automatically resume their normal position when the draw-bar is relieved of the draft thereon. The forward pull on the said draw-bar also forwardly rotates the arm 10 and with it the rock shaft 6 thereby elevating the brake-shoe brackets 14 by means of the arms 7, in which position they will be rigidly supported until the draft on the draw-bar 22 is released, when the rock-shaft will resume its normal position through the influence of the coil springs 41 and 42. Simultaneously with the elevation of the brackets 14 the blocks 18 will be pushed rearwardly on the same within the bracket 8 and beneath the transverse pin 8' fixed in the top of the brackets 8, whereby the upward movement of the brackets 14 are limited. On a descending grade so long as there is a draft upon the draw-bar and its connections with the brake levers the brake-shoes 15 will merely contact with the wheels 2, as shown in Fig. 3, but as soon as the draft ceases, the tension of the coil springs 30', 32, 41 and 42 promptly force the brackets 14 rearward whereby the shoes 15 turn over rearwardly under the friction of the wheels and firmly lock the wheels by an engagement of their flat faces 15' with the wheels, as shown in dotted outline in Fig. 3. This locking action of the brake mechanism is, of course, automatic under the recoil of the said springs. When ascending a hill and it is desired to lock the vehicle against a retrograde movement to rest the team, for example, the eccentric brake shoes will, when the draft on the mechanism is released, be forced by the wheel into the position shown by dotted lines in Fig. 5, whereby the wheels will be firmly locked and the shoes prevented from turning further by the engagement of the lateral pins 2' with the upper edge of the brackets 14. When it is desired to leave the draft team standing without hitching, the operator readily sets the brake mechanism against the power of the team to release the brakes by the forward draft, by pulling the forward end of the rod 51 laterally by means of the rod 54 and its operating hand-lever 55, whereby it will engage the rear end of the slot 49 of the cam plate 45, whereby the forward movement of the double-tree to its limit under the impulse of the draft can have no effect upon the brake-levers or their connections. When it is desired to temporarily secure the brake mechanism out of action, as for example when operating only upon level ground, the operator adjusts the plate 48 forward into the position shown by dotted lines in Fig. 1 by means of the lever 45 and the hand-lever 46, thereby withdrawing the brake shoes clear of the wheels, after the lever 46 is rigidly fixed in such position. It is thus obvious that my invention is prompt, reliable and automatic in action, and that it exerts its holding or braking power with a degree of force approximately proportional to the incline upon which the same is used.

Having thus described my invention and the manner of employing the same, what I desire to secure by Letters Patent is:

1. In an automatic wagon brake, a movable double-tree; pivotally mounted brake-shoes; brake-levers operatively connected at their outer ends with the brake-shoes; a draw-bar slidably supported in substantially right-angular relation to the said levers; spring-pressed means for pivotally connecting the draw-bar with the inner ends of the levers; means for pivotally connecting the draw-bar with the said double-tree, whereby the draft of the motive power on the double tree tends to withdraw the brake-shoes from their engagement against the resistance of the said spring-pressed means; and spring-pressed means for connecting the draw-bar to the brake-shoe elevating means.

2. In an automatic wagon brake, a laterally slidable double-tree; a brake-beam; brake-shoes on the ends of the brake-beam; brake-levers fulcrumed near the ends of the said beam and pivotally connected at their outer ends to the brake-shoes by means of the brackets 14; spring-pressed means for normally securing the brake levers in operative position; and means for connecting the last mentioned means with the said double-tree.

3. In an automatic wagon brake, a laterally slidable double tree; a brake-beam; brake shoe brackets pivotally connected to the outer ends of the respective brake levers; brake-shoes pivotally mounted in the said brackets; brake-levers fulcrumed on the brake-beam near the ends thereof and pivotally connected to the said brackets; a horizontal plate secured at one end to the beam midway of its ends; a draw-bar slidably mounted upon the other end of the plate; spring-pressed means for normally securing the brake shoes in their engagement; and means for operatively uniting the draw-bar to the double-tree.

4. In an automatic wagon brake a laterally slidable double-tree; a transverse brake-beam; brake-shoes pivotally mounted on the brake-beam; means for automatically elevating the brake-shoes when not in action; means for limiting the upward movement of the brake shoes when in action; brake-levers fulcrumed on the brake-beam and connected at their outer ends to the brake-shoes; a slidably mounted draw-bar; pivoted levers fulcrumed in right-angular relation to the draw-bar, and pivotally connected therewith by suitable interposed means, and with the brake-levers; spring-pressed means for securing the said pivoted levers in their normal position; spring-pressed means for connecting the draw-bar to the brake-shoe elevating means; spring-pressed means for connecting the last mentioned means to the means for limiting the upward movement of the brake-shoes; and means for pivotally connecting the draw-bar with the double-tree.

5. In automatic wagon brake mechanism a brake-beam; brake shoes slidably fulcrumed on the brake-beam by suitable carrying brackets; means for elevating the brake-shoes; means for limiting their upward movement; brake levers fulcrumed on the brake beam near its ends; and spring-pressed means for normally securing the brake-shoes in position for action, consisting of a base plate whose rear end is fixed to the front edge of the beam midway of its ends; a standard fixed on the base plate near its forward end; a draw-bar slidably mounted in the standard; levers pivotally fulcrumed on the base-plate forward of the brake levers and pivotally connected therewith and with the draw-bar; spring pressed means for securing the previously mentioned levers in their normal position; and spring-pressed means for pivotally connecting the draw-bar with the means for elevating the brake-shoes, and with the means for limiting their upward movement.

6. In an automatic wagon brake, a movable double-tree; pivotally mounted brake-shoes; brake-levers operatively connected at their outer ends with the brake-shoes; a draw-bar slidably supported in substantially right-angular relation to the said levers; spring-pressed means for pivotally connecting the draw-bar with the inner ends of the levers; means for pivotally connecting the draw-bar with the said double-tree, whereby the draft of the motive power on the double tree tends to withdraw the brake-shoes from their engagement against the resistance of the said spring-pressed means; means for setting the brake mechanism in action beyond the control of the motive power of the vehicle; and means for setting the brake mechanism out of its normal position for action.

Signed by me at Fort Wayne, Allen county, State of Indiana, this 9th day of January, A. D. 1909.

CHARLES GARVER.

Witnesses:
AUGUSTA VIBERG,
AUGUSTE SPIEGEL.